No. 613,734.  
F. F. SWAIN.  
METALLIC PACKING.  
(Application filed Apr. 27, 1898.)  
Patented Nov. 8, 1898.
(No Model.)
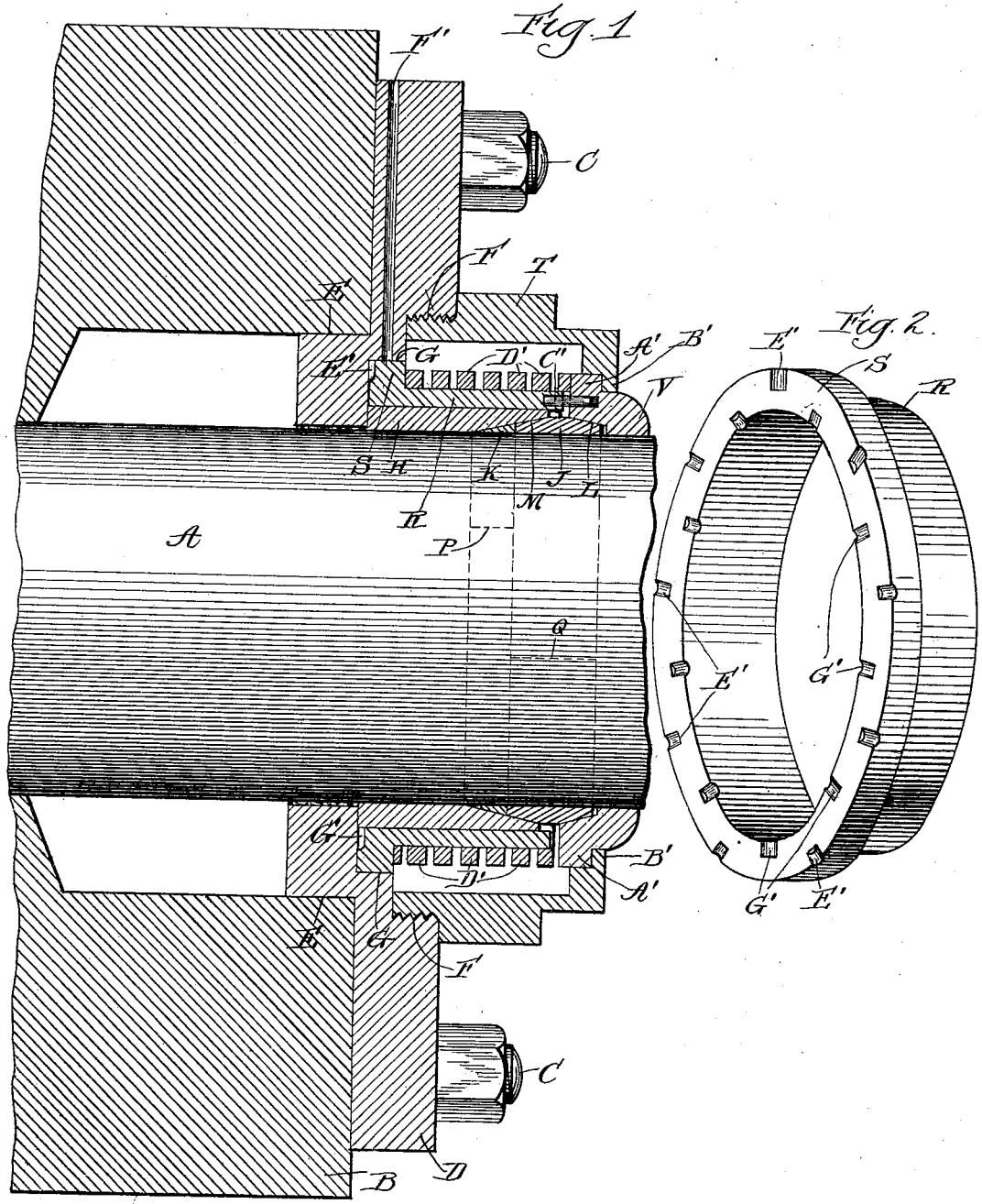
Witnesses  
Wm. F. Henning  
R. A. White.
Inventor  
Frederick F. Swain  
by Brown & Darby  
Attys.

UNITED STATES PATENT OFFICE.

FREDERICK F. SWAIN, OF CHICAGO, ILLINOIS.

METALLIC PACKING.

SPECIFICATION forming part of Letters Patent No. 613,734, dated November 8, 1898.

Application filed April 27, 1898. Serial No. 678,976. (No model.)

*To all whom it may concern:*

Be it known that I, FREDERICK F. SWAIN, a citizen of the United States, residing at Chicago, in the county of Cook and State of Illinois, have invented a new and useful Metallic Packing, of which the following is a specification.

This invention relates to metallic packing.

The object of the invention is to provide a metallic packing for shafts, rods, or the like which is simple in construction and efficient in use.

The invention consists, substantially, in the construction, combination, location, and relative arrangement of parts, all as will be more fully hereinafter set forth, as shown in the accompanying drawings, and finally specifically pointed out in the appended claims.

Referring to the accompanying drawings and to the views and reference signs appearing thereon, Figure 1 is a view in central longitudinal section of a packing embodying the principles of the invention. Fig. 2 is a detached detail view in perspective of the exterior packing-sleeve.

In the drawings reference sign A designates the shaft, rod, or the like to which the packing is to be applied.

B designates a portion of the head of the cylinder, journal-bearing, or the like. Suitably mounted on the head B, by means of bolts C or otherwise, is the gland D. This gland is in the form of a ring centrally perforated for the free passage therethrough of shaft, rod, or the like A, and is suitably countersunk on the inner face thereof to form a shoulder E, which fits snugly into the open end of head B. On its outer surface gland D is preferably formed with two countersunk portions, one within the other, thus forming the shoulders F G, the purpose, function, and coöperative relation of which will presently be more fully explained.

Reference sign H designates what I shall hereinafter term the "interior packing-ring." This ring is cylindrical on both its external and internal surface, except at the outer end thereof its bore is conical, as shown. This internal packing-ring is of an internal diameter adapting it to fit tightly upon the shaft or rod A, and its inner end is arranged to bear against the outer surface of the countersink in gland D, which forms shoulder G. The ring H may be of any suitable material, preferably of soft steel.

Reference signs J K designate split rings of suitable material—such, for instance, as brass—placed tightly upon shaft or rod A. These rings are cylindrical on their internal surface. The external surface of ring J is beveled in opposite direction from its medial line, as indicated at L M. The external surface of ring K is conical or beveled in true continuation of the beveled surface M of ring J. The flaring or conical bore of interior packing-ring H is arranged to receive the split rings J K, and hence by reason of the conical exterior surface of said rings J K they form wedges which, when pressure is applied to packing-ring H in a direction to force the same outwardly from cylinder or bearing head B, serve to more tightly compress said rings J K upon shaft or rod A and to more tightly close the joint between the external surface of said rings J K and the interior surface of packing-ring H. Thus an absolutely steam and water tight joint is secured. In order that no steam or water may escape through or between the split ends of rings J K, said rings are lap-joined, as clearly indicated in dotted lines at P Q, Fig. 1, and by employing two wedge-rings J K lap-joined, as above explained, I am enabled to use split rings, thus facilitating the assembling of the parts without loss of efficiency in the packing.

A sleeve R, which I shall herein designate the "exterior self-seating packing-sleeve" and which may be of any suitable material, preferably of cast-iron, is slipped over interior packing-ring H. This packing-sleeve is of an internal diameter enabling it to fit tightly upon the packing-ring. At its inner end packing-sleeve R is provided with a flange S, which is arranged to fit snugly within shoulder G, and the end surface thereof, which may be and preferably is case-hardened, is arranged to bear or seat against the surface of the countersink in gland D which forms shoulder G.

From the foregoing description it will be seen that I provide a packing which is firmly compressed or contracted upon the shaft or rod to be packed and which therefore rocks or rotates with the shaft or rod.

The whole of the parts comprising the packing above described are inclosed in a cap, which includes the cap-nut T and the follower or cap-sleeve V. The cap-nut T is exteriorly threaded on the inner end thereof and is adapted to be screwed into a threaded seat formed in the shoulder F of gland D. The cap-sleeve or follower V is arranged to pass over shaft or rod A, and a peripheral flange A', formed thereon, is arranged to be inclosed and engaged by an inwardly-projecting flange B', formed on cap-nut T. By this construction it will be seen that when cap-nut T is screwed into its seat the follower or cap-sleeve V, while loose with respect to the cap-nut, is also crowded up upon the wedge-ring J. On its inner face cap-sleeve or follower T is formed with a tapering or conical bore which conforms to the taper surface L of wedge-ring J and which receives said taper surface of said wedge-ring. Therefore a wedging action is secured when cap-sleeve V is forced or crowded upon the wedge-ring, which serves to make a tight and efficient packing-joint and also serves to compress or bind the wedge-ring upon the shaft or piston and the cap-sleeve or follower upon the wedge-ring, and hence so binding the parts together as to cause both wedge-ring J and cap-sleeve or follower V to rock or rotate with the shaft or rod, the loose connection between the cap-sleeve and the cap-nut permitting the rotary or rocking movement of the cap-sleeve with respect to the cap-nut. In order that all the parts of the packing may be connected to rock or rotate together with the shaft or piston, the cap-sleeve V may be suitably connected to exterior packing-sleeve R, as by means of dowel-pin C'.

In order to insure absolute efficiency in the packing, it is desirable that the end surface of packing-sleeve R constantly seat or bear against the surface of the countersink in gland D which forms shoulder G. At the same time it is important to provide for any slight longitudinal movement which may be imparted to the shaft or rod by reason of continued use or wear in its operating connections. In order to accomplish these objects, I interpose a suitable tension—for instance, a spring D'—between flange S of the packing-sleeve and flange A' of cap-sleeve V. In the particular form shown, to which, however, the invention is not limited, I employ a coil-spring which is coiled upon packing-sleeve R and the tension of which is constantly exerted in a direction to press the chilled or end surface of packing-sleeve R into contact with its seat. The dowel-pin C' is of such arrangement as to permit the slight movement of cap-sleeve V toward or from packing-sleeve R during any longitudinal movement of the shaft.

From the foregoing description it will be seen that by reason of the wedging action secured through wedge-rings K J the packing-ring H and also the cap-sleeve V are tightly bound to the shaft or piston to be packed, and hence rotate or rock therewith, while at the same time forming steam and water proof joints between each other. It will also be seen that by reason of the dowel-pin or other connection between the cap-sleeve V and packing-sleeve R said packing-sleeve also rocks or rotates with the shaft or rod; but the tension applied to said packing-sleeve constantly seats the same against the bearing-surface or wall of the gland, while permitting any slight endwise or longitudinal movement of the shaft or rod that may develop from wear or unevenness or other cause. Thus the packing-sleeve R is constantly pressed or held in contact with the adjacent surface of the gland, and by reason of the rocking or rotating movement of said sleeve it wears its own seat, and hence maintains an efficient packing-joint against the surface of the gland. It will be readily understood that this bearing-surface between the end of packing-sleeve R and the seat therefor in the gland is the only point where any appreciable amount of friction is developed. This is true for the reason that steam or other pressure exerted upon the surface of the inner end of packing-ring H tends to move said packing-ring away from contact with the adjacent wall or surface of the gland D, while after the follower or cap-sleeve V has been initially crowded upon wedge-ring J by screwing up the cap-nut any friction liable to be developed between such cap-sleeve and cap-nut may be readily avoided by easing off or slightly unscrewing the cap-nut.

In order to reduce the friction between the end surface of packing-sleeve R and its seat against the adjacent wall or surface of the gland D to the lowest possible degree without impairing the efficiency of the joint at this point, I provide means for supplying a lubricant to this surface. This idea may be carried out in many ways. While, therefore, I have shown and will now describe an arrangement embodying my idea, I do not desire to be limited or restricted thereto. In the form shown I provide pockets or cells E' in the end surface of packing-sleeve R at various and suitable points, such cells or pockets extending from the outer periphery of such end surface toward but not entirely to the inner periphery thereof, as clearly shown in the drawings, and I provide an oil duct or passage F' in gland D, which extends to the surface of flange S. In this manner an efficient lubrication of the bearing-surface of sleeve R may be maintained. If desired, a similar series of lubricating pockets or cells G' may be provided in the end or bearing surface of packing-sleeve R, which extend from the inner periphery toward but not entirely to the outer periphery, thus enabling water or condensed steam to enter and aid in lubricating the bearing-surface of said sleeve.

It is believed that the operation of the packing will be readily understood from the foregoing description, taken in connection with the accompanying drawings.

While I have shown and described a specific construction embodying the principles of my invention, I desire it to be understood that many changes therein and variations therefrom may readily occur to persons skilled in the art and still fall within the spirit and scope of my invention. My invention therefore is not limited or restricted to the exact details of construction and arrangement shown and described; but, Having now set forth the object and nature of my invention and a form of construction and arrangement embodying the same, what I claim as new and useful and of my own invention, and desire to secure by Letters Patent of the United States, is—

1. In a metallic packing, a shaft or rod, and a gland, said gland provided with a countersunk seat in the outer face thereof, in combination with a packing-sleeve arranged to bear against the surface of said countersunk seat, said sleeve mounted on to rotate with the shaft or rod, but capable of endwise movement relative thereto, as and for the purpose set forth.

2. In a metallic packing, a shaft or rod, and a gland, said gland provided with a countersunk seat in the outer face thereof, in combination with a packing-sleeve arranged to bear against the surface of said countersunk seat, said sleeve mounted on to rotate with the shaft or rod, but capable of endwise movement relative thereto, and means for constantly pressing said sleeve to its bearing against the surface of said gland, as and for the purpose set forth.

3. In a metallic packing, a shaft or rod, and a gland, in combination with a packing-sleeve, means for maintaining said packing-sleeve constantly seated against the surface of said gland, said gland provided with a lubricating duct or passage delivering to the bearing-surfaces of said gland and sleeve, as and for the purpose set forth.

4. In a metallic packing, a shaft, a packing-gland, a packing-sleeve loosely mounted on, for free movement longitudinally with respect to, the shaft, connections between said shaft and sleeve for securing coincident rotation of said parts, while permitting said relative longitudinal movement, and a spring arranged to constantly press said sleeve into contact with the surface of said gland, as and for the purpose set forth.

5. In a metallic packing, a shaft or rod, a gland, a packing-sleeve arranged to seat against said gland, a cap and a spring interposed between said cap and sleeve and constantly tending to seat said sleeve, as and for the purpose set forth.

6. In a metallic packing, a shaft or rod, a gland, a packing-sleeve, an inclosing cap comprising a cap-nut and a cap-sleeve, means for binding said cap-sleeve to move with said shaft or rod, and connections between said cap-sleeve and said packing-sleeve whereby said parts rotate or rock together, as and for the purpose set forth.

7. In a metallic packing, a shaft or rod, a gland, a packing-sleeve, a cap-nut, a cap-sleeve engaged thereby, said cap-sleeve mounted on to move with said shaft or rod, connections between said cap-sleeve and packing-sleeve whereby said parts rotate or rock together, and a spring interposed between said cap-sleeve and said packing-sleeve and constantly tending to seat said packing-sleeve against said gland, as and for the purpose set forth.

8. In a metallic packing, the combination with a shaft or rod, and a gland, of a packing-ring mounted on said shaft or rod, means for binding said ring to move with the shaft, and a packing-sleeve mounted on said ring, said sleeve adapted to rotate or rock with said ring but held against movement endwise of the shaft or rod, as and for the purpose set forth.

9. In a metallic packing, the combination with a shaft or rod, and a gland, of a packing-ring mounted on said shaft or rod and provided with a flaring bore, a wedge-ring mounted on the shaft or rod and adapted to be received in said flaring bore, and a packing-sleeve mounted on said ring and bearing against said gland, as and for the purpose set forth.

10. In a metallic packing, the combination of a shaft or rod, a gland, a packing-ring provided with a flaring bore, a wedge-ring, a packing-sleeve, and means for constantly maintaining said packing-sleeve seated against said gland, as and for the purpose set forth.

11. In a metallic packing, the combination with a shaft or rod, a gland, a packing-ring having a flaring bore, split wedge-rings, lap-jointed with respect to each other, a packing-sleeve mounted on the packing-ring, and a spring arranged to constantly maintain said sleeve seated against said gland, as and for the purpose set forth.

12. In a metallic packing, a shaft or rod, a gland, a packing-sleeve having its end arranged to seat against said gland, means for constantly maintaining said sleeve seated, said sleeve provided in its bearing-surface with lubricating cells or pockets, said gland provided with a duct or passage for delivering a lubricant thereto, as and for the purpose set forth.

In witness whereof I have hereunto set my hand, this 25th day of April, 1898, in the presence of the subscribing witnesses.

FREDERICK F. SWAIN.

Witnesses:
S. E. DARBY,
E. C. SEMPLE.